Figure 7:
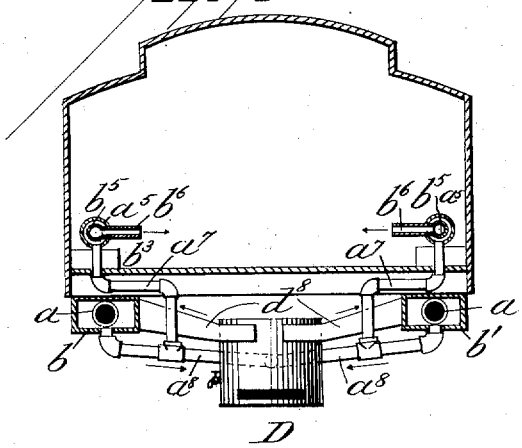

5 Sheets—Sheet 1.
E. F. ROBERTS.
Assignor of one-half to T. R. SULLY.
SYSTEM OF VENTILATING AND HEATING CARS.
No. 11,054. Reissued Jan. 7, 1890
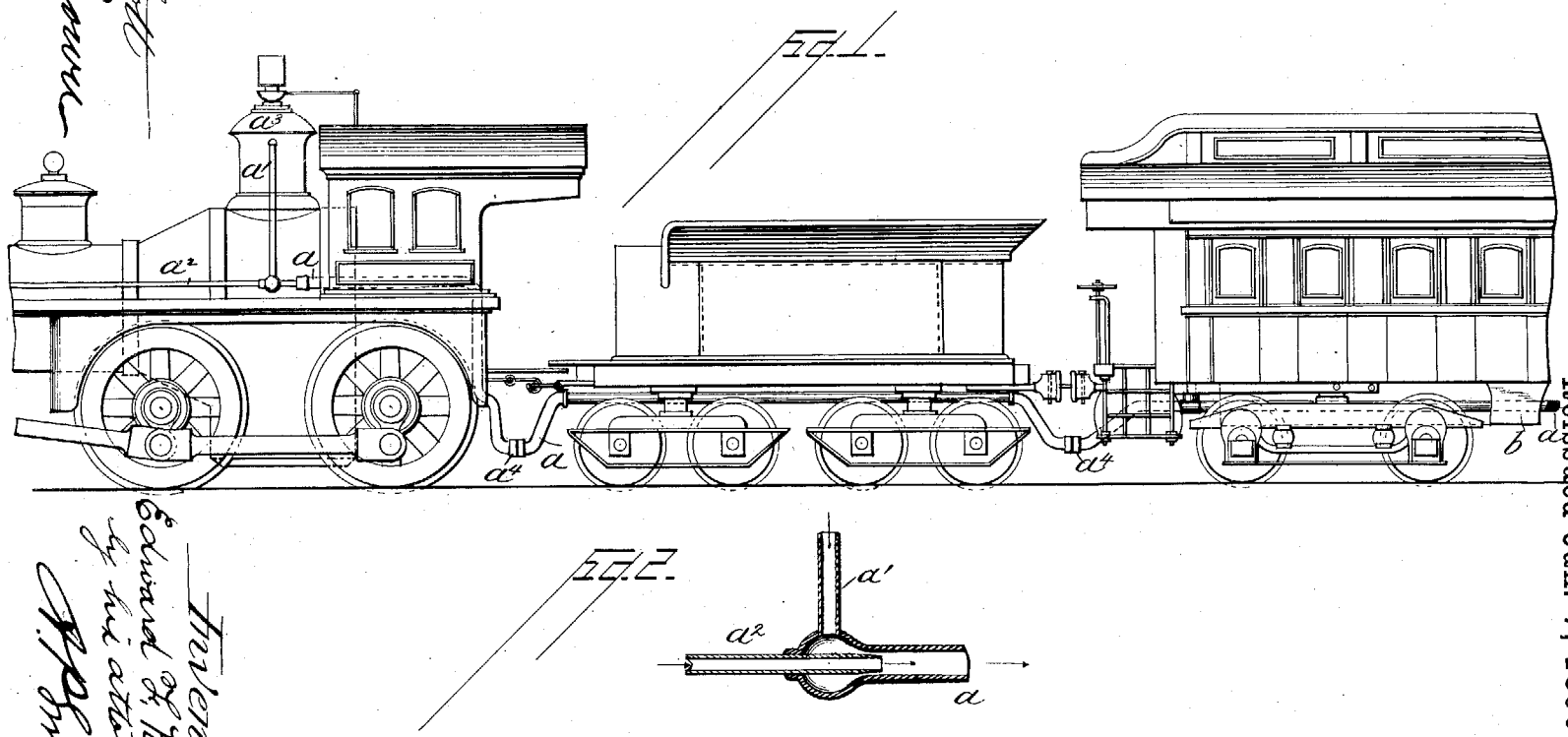
Attest:
F. H. Schott
T. H. Brown
Inventor.
Edward F. Roberts
by his attorney
A. P. Smith

E. F. ROBERTS.
Assignor of one-half to T. R. SULLY.
SYSTEM OF VENTILATING AND HEATING CARS.
No. 11,054. Reissued Jan. 7, 1890.
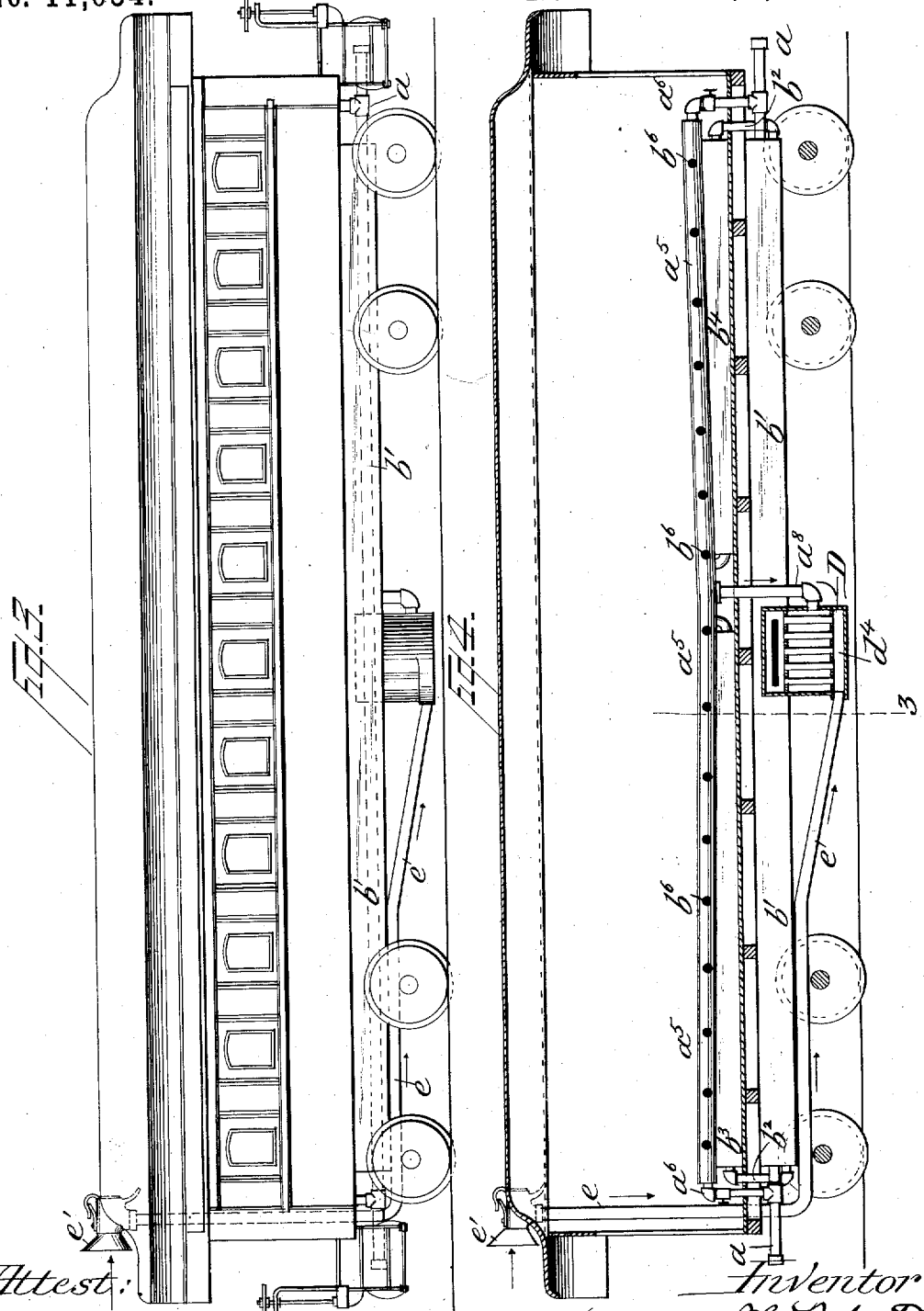
Attest:
F. H. Schott
J. H. Brown.
Inventor
Edward F. Roberts
by his attorney
A. P. Smith E. F. ROBERTS.
Assignor of one-half to T. R. SULLY.
SYSTEM OF VENTILATING AND HEATING CARS.
No. 11,054. Reissued Jan. 7, 1890.
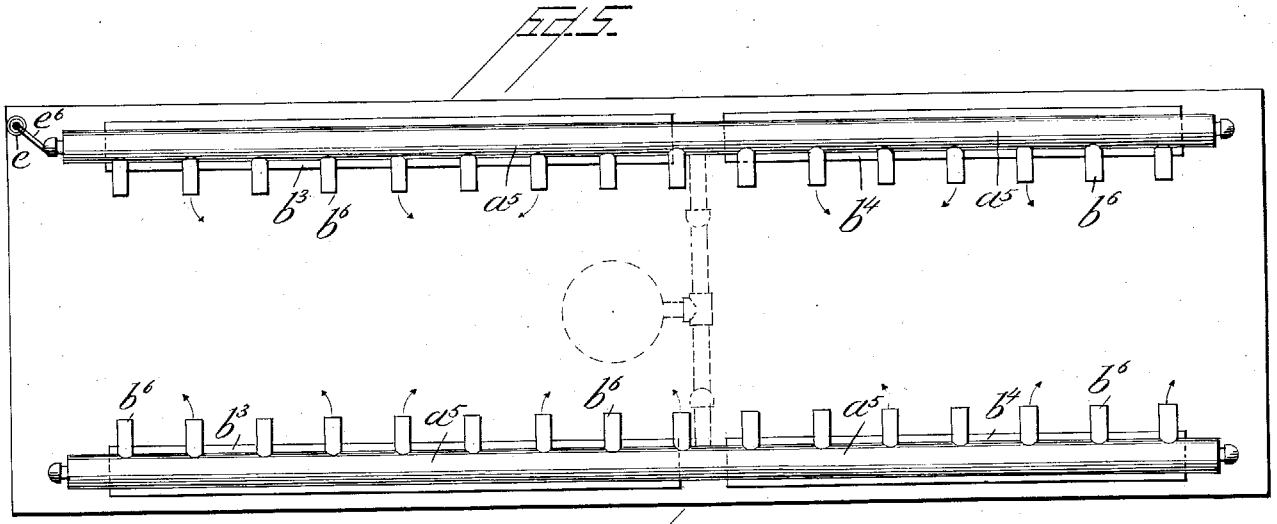
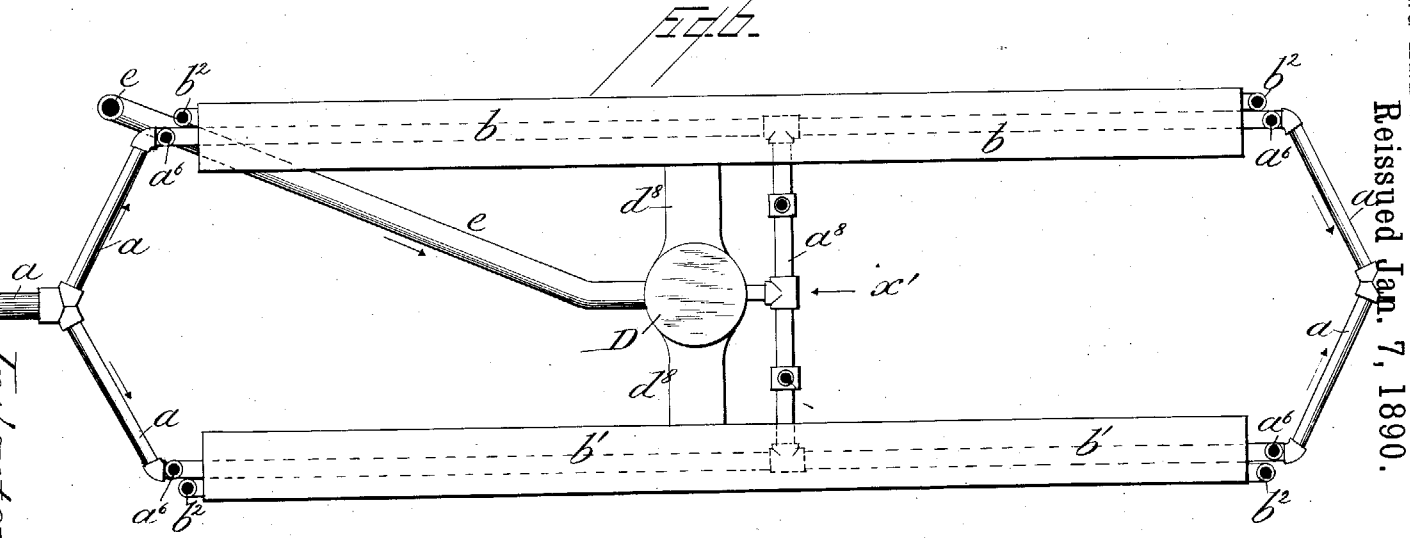
Attest:
F. H. Schott
T. H. Brown.
Inventor
Edward F. Roberts
by his attorney
A. P. Smith

E. F. ROBERTS.

Assignor of one-half to T. R. SULLY.

SYSTEM OF VENTILATING AND HEATING CARS.

No. 11,054. Reissued Jan. 7, 1890.

Attest:
F. H. Schott
J. H. Brown

Inventor
Edward F. Roberts
by his attorney
A. P. Smith

E. F. ROBERTS.

Assignor of one-half to T. R. SULLY.

SYSTEM OF VENTILATING AND HEATING CARS.

No. 11,054. Reissued Jan. 7, 1890.

Attest:

H. H. Schott

T. H. Brown

Inventor,

Edward F. Roberts by his attorney

A. P. Smith

UNITED STATES PATENT OFFICE.

EDWARD F. ROBERTS, OF ROCHESTER, ASSIGNOR OF ONE-HALF TO THOMAS R. SULLY, OF BUFFALO, NEW YORK.

SYSTEM OF VENTILATING AND HEATING CARS.

SPECIFICATION forming part of Reissued Letters Patent No. 11,054, dated January 7, 1890.

Original No. 394,508, dated December 11, 1888. Application for reissue filed October 14, 1889. Serial No. 327,020.

*To all whom it may concern:*

Be it known that I, EDWARD F. ROBERTS, a subject of the Queen of Great Britain, residing at Rochester, in the county of Monroe and State of New York, have invented certain new and useful Improvements in Systems of Ventilating and Heating Cars; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

The primary object of this invention is to properly heat railway-cars by both the direct and indirect methods of heating, and at the same time to properly ventilate the cars by the introduction of pure air into the same.

The invention is further designed to utilize not only the heat resident in the live steam in the direct system which heats the air in the car, but also to use the condensed steam in heating the air which is introduced into the car and heats the same by the indirect method.

The several additional ends which my invention is intended to secure are to purify the air before it enters the car and control the volume and rate of movement of the air-current, to introduce the heated air at its highest temperature and greatest volume into the ends of the car near the doors, where it is most needed, to heat the car when side-tracked or when standing in the station, and also to combine with the live steam from the dome of the locomotive the exhaust-steam from the cylinders.

In the accompanying sheets of drawings, in which similar letters of reference are employed to indicate like parts in each of the views, are illustrated the various mechanical devices employed to accomplish the various objects above specified.

In said drawings, Figure 1 is a side elevation of a portion of a locomotive and a car. Fig. 2 is a sectional view of the device employed to mix the live and exhaust steam. Fig. 3 is a side elevation of a car, showing the arrangement of that portion of my system arranged beneath the car. Fig. 4 is a sectional view of said car, taken longitudinally therethrough, illustrating the arrangement of the various portions of the system without and within the car.

Figure 8:
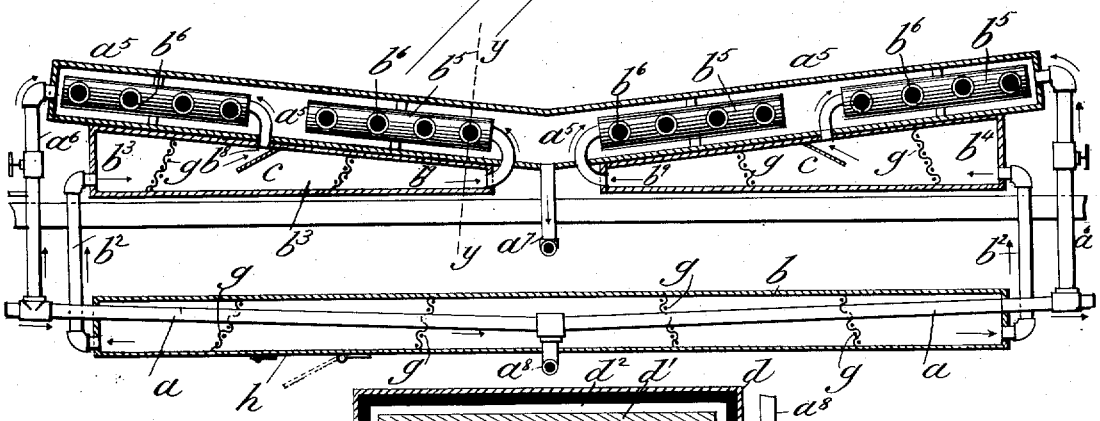
Figure 9:
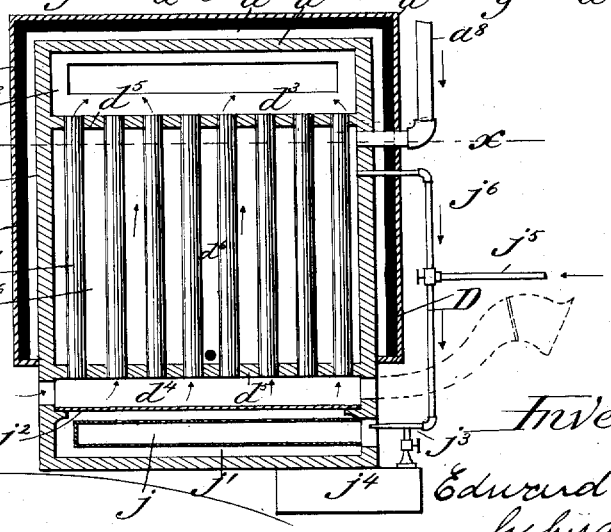

On Sheet 3, Fig. 5 is a floor plan of the interior of the car. Fig. 6 is a plan of that portion of the system placed beneath the bottom of the car. Fig. 7 is a transverse section of the car, taken through $z$, Fig. 4. Fig. 8 is a longitudinal section through the air receiving and discharging chambers arranged within and without the car and the several steam-pipes employed therewith; and Fig. 9 is a section of the condensed-steam receptacle, taken through $x'$, Fig. 6.

Figure 10:
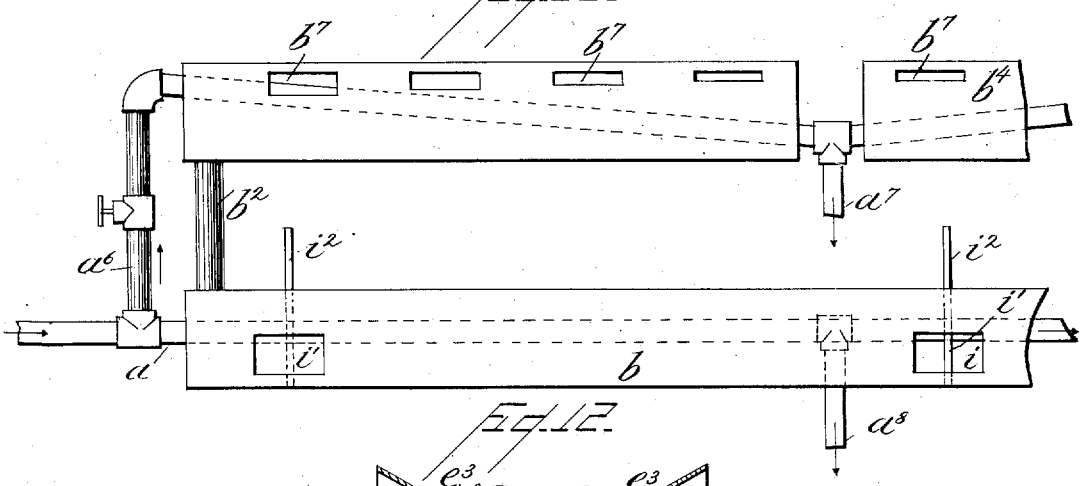
Figure 12:
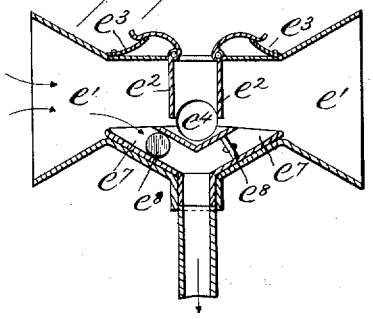
Figure 11:
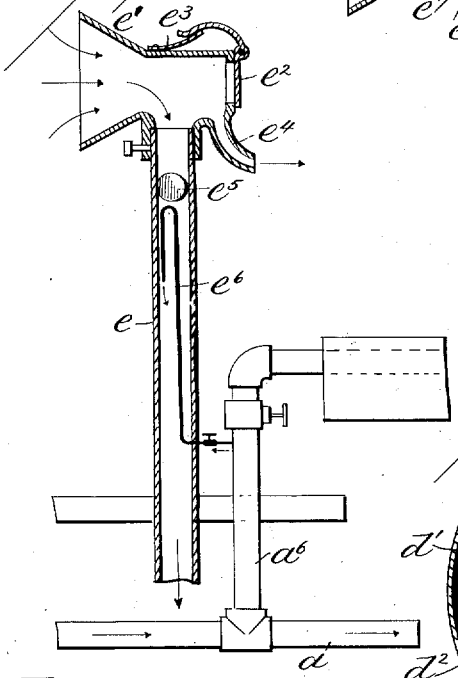
Figure 13:
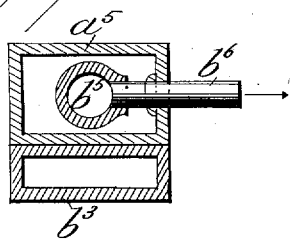
Figure 14:
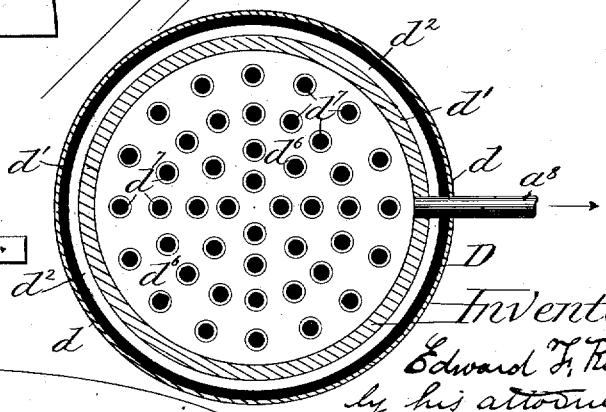

On Sheet 5, Fig. 10 is a detail view, in elevation, of another construction of the air-distributing chamber, &c. Fig. 11 is a section of the hood and pipe which receive and convey the air to the receiving-chambers, and a portion of the steam-pipes. Fig. 12 is a section of a modified construction of the air-receiver. Fig. 13 is a section of one of the air-distributing pipes and the inclosing steam-chamber, taken through $y$, Fig. 8; and Fig. 14 is a transverse section through $x$, Fig. 9.

In said above-described views, $a$ indicates the main supply-pipes which convey the steam from the locomotive to the cars of the train, and with which the pipes $a'$ and $a^2$, from the steam-dome $a^3$ and the cylinder of the locomotive, respectively, join, and at the point of connection of said pipes $a$, $a'$, and $a^2$ is arranged the device employed to unite the live and exhaust steam, which is illustrated in Figs. 1 and 2 and will be described in detail hereinafter. As indicated in Figs. 4 and 6, said steam-pipes pass beneath and on opposite sides of each car of the train, and are connected between the cars by any suitable coupling $a^4$. Inclosing that portion of the main steam-pipes beneath each car are air-receiving chambers or boxes $b$ $b'$, which extend from end to end of the car, and which communicate through pipes $b^2$ with separately-arranged air-chambers $b^3$ $b^4$, grouped in pairs on opposite sides of the interior of the cars, as indicated in Figs. 4 and 8.

A steam-pipe $a^5$ is arranged contiguous to each of said pairs of boxes $b^3$ $b^4$, and is connected by pipes $a^6$ with the main supply-pipe, and arranged within said steam-pipes or chambers $a^5$ are air-distributing pipes $b^5$, provided with tubes $b^6$, projecting therefrom through the pipe $a^5$ into the car, as shown in Figs. 5 and 7. As shown in Fig. 8, each of said pipes $b^5$ opens into the one or the other of the air-boxes $b^3$ $b^4$ through pipes $b^8$ $b^9$, and through said pipes the air flows into the distributing-pipes and thence into the car. By the arrangement shown in Fig. 8 but two of said distributing-pipes are shown communicating with each of the boxes $b^3$ $b^4$; but, as will be understood, as many more or less of said distributing-pipes may be used as may be necessary in order to increase or diminish the quantity of air introduced into the car.

Instead of expelling the air through the distributing-pipes above described into the car, said pipes and the inclosing steam-pipe may be dispensed with and the air forced into the cars directly from the air-boxes $b^3$ $b^4$, which thus become distributing mediums. When thus used, a steam-pipe is arranged within said boxes, as shown in Fig. 10, to heat the air.

As hereinbefore mentioned, one of the objects of my invention is to introduce the largest volume of heated air at the ends of the car and to have the air so introduced at its highest temperature, because at those points, owing to the constant opening and closing of the doors, the escape of the heat is most rapid. To accomplish this result when the air is introduced into the car directly from the boxes $b^3$ $b^4$, (shown in Fig. 10,) the openings $b^7$ in said boxes through which the air escapes vary in size with the largest opening or openings in the ends thereof leading to the end of the car. When the air is introduced into the car through the distributing-pipes shown in Fig. 8, the tapering or wedge-like form of box is preferably used with openings $b^8$ and $b^9$ in the broad and narrow portions of said boxes communicating with the pipes $b^5$. The effect of this peculiar tapering form of box is, as the air enters the large end thereof, it flows through the box into the narrow end thereof, and being compressed retards the movement of the air back of the compressed volume and compels the air to flow through the opening $b^8$ into the distributing-pipes in the end of the steam-pipe $a^5$, and thence into the ends of the cars. To facilitate this operation, the opening $b^8$ in the large end of the air-box may be larger than the opening $b^9$ in the small end of said box, as shown in Fig. 8; also a plate $c$ may be arranged near the larger opening at an angle, so as to direct the greater portion of the air into said larger opening.

When the tapering form of air-box is used and the additional distributing and steam pipes are employed in connection therewith, steam-pipes $a^5$ are arranged upon the top thereof and slope toward the center of the car, thus conforming to the inclination of the top of said boxes and collecting the condensed steam at the lowest point in said steam-pipe $a^5$, from which the condensed steam is conducted by pipe $a^7$ to the condensed-steam receptacle beneath the car.

As indicated in Fig. 8, the main steam-pipe $a$, which passes through the air-box, is also arranged so as to dip or incline downward from each end of the car toward the center thereof, and from the lowest point in said main pipe the condensed steam is conducted by pipe $a^8$ into the condensed-steam receptacle above mentioned.

Beneath the car, and preferably beneath the center and midway between the sides thereof, is placed the said condensed-steam receptacle, which consists of an outer shell D, next to which is arranged an annular sheet of asbestus or other packing $d$, (indicated by the heavy line in Fig. 9,) between which and the inner shell $d'$ is an annular air-space $d^2$. In the upper and lower portions of the inner shell $d'$ are air-chambers $d^3$ and $d^4$, and between and separated from said air-chambers by partitions $d^5$ is a chamber $d^6$, into which the condensed steam is introduced and retained. Extending through said condensed-steam chamber $d^6$ and the partitions $d^5$, and opening into each of the air-chambers are pipes $d^7$, through which the air passes from the lower to the upper air-chamber. The upper air-chamber $d^3$ is connected with each of the air-boxes $b$ $b'$ by flues $d^8$, Fig. 7.

The air is admitted into the lower air-space $d^4$ through the pipe $e$, which, as shown in Figs. 3, 4, and 6, extends beneath the car to one corner thereof, and then continues up through the same and out through the roof, and is provided at its extremity with an air-receiving hood, the purpose of which will be explained hereinafter. This arrangement of the pipe for collecting and conducting the air into the air-chambers $d^4$ is but one of many arrangements which may be used, and therefore I do not wish to limit the invention to that construction and arrangement, as the air may be taken in above or below the car or at any point around the same. The arrangement shown in the drawings is, however, considered preferable, in view of the greater purity of the air at a distance from the ground.

On the right of Fig. 9 is indicated by dotted lines a funnel for conducting the air from beneath the car into the chamber $d^4$.

The hood or device for collecting the air and leading the same into the air-conducting pipe $e$ is illustrated in detail in Fig. 11, and consists of the receiver $e'$, which is adjustably secured to the end of said pipe $e$, so as to be turned with the opening in the direction in which the train is moving, and is attached to said pipe so as to extend on both sides thereof. At the end of said receiver opposite to that through which the air enters is arranged a cover or damper $e^2$, which closes the said end of the receiver, and is held closed by means of a spring $e^3$, a weight, or any equivalent device whereby the said cover may be held in position at any desired pressure.

Between the end of the pipe $e$ and the damper $e^2$ is an opening or pipe $e^4$, through which the particles of dust, snow, &c., fall when carried over the end of the pipe $e$ by their momentum, when said momentum is not sufficient to open the damper. This is liable to happen when the air is moving in the same direction as the train. The purpose of my construction is to so regulate the force with which the cover is held in position that the pressure of the air as it enters the pipe $e$ remains the same, and any increase of this pressure will open the damper and permit the excess of air to escape through the receiver. As thus arranged, the volume of air which flows into the car can be increased or diminished, and also the rate of movement of the air-current can be accelerated or retarded. A damper $e^5$ is also used in the pipe $e$ to regulate the volume of air. This device also performs the first operation in the purification of the air by removing the larger particles of dust, cinders, snow, &c., since by the rapid movement of the train the weight and velocity of the said particles carry them over the pipe, so that they are not carried down into the said pipe. The air is still further purified and its movement accelerated by introducing a jet of steam into the pipe $e$, and also into any of the other pipes, if desirable, the pipe $e^6$, (shown in Fig. 11,) which connects with the main steam-pipe, or the pipe $e^8$, being used for this purpose.

Having thus set forth the construction and arrangements of certain different parts of my invention, as illustrated in the drawings, I will now describe the operation and relative purpose of said parts when in use.

The steam from the locomotive passes through the main supply-pipe to each of the cars and also flows in its passage through the pipes $a^6$ up into the pipes or chambers $a^5$, which may be of any desired cross-section, and which heat the cars by radiation and contact, being that portion of my system which operates according to the direct method. The steam and water of condensation from said pipes $a^5$, and also that from the main steam-pipe $a$, are conducted into the condensed-steam receptacle beneath the cars through the pipes $a^7$ $a^8$. (Shown more clearly in Fig. 7.) When the chamber $d^6$ becomes filled with the condensed steam and the heat therein has been abstracted therefrom, the water is drawn off through a faucet, (shown in Fig. 7,) or in any suitable manner. In the operation of the indirect system the air passes into the receiver $e'$ and thence down through the pipe $e$, wherein the air is moistened by the steam-jet, and the particles of dust are precipitated by the effect of the wet steam. From the pipe $e$ the partially-purified air passes into the lower air-chamber $d^4$, whence it flows through the pipes $d^7$ into the chamber $d^3$ and thence passes into the air-boxes $b$ $b'$ through the flues $d^8$. As the air flows through the pipes $d^7$ it becomes heated by contact with the heated pipes, which are thus heated by the condensed steam.

Instead of using the straight air-pipes $d^7$, above described, a coil or a number of coils may be used to hold the air longer under the heating influence of the condensed steam. In this manner not only is great economy had by thus abstracting the heat from the generally wasted condensed steam, but also the impact of a cold body of air directly upon the main supply-pipe and the consequent injurious effect thereof is avoided. The air, after having been partially heated, as above described, now flows through the air-boxes $b$ $b'$ around the main steam-pipe and the heat therefrom is imparted directly to the air. These boxes or flues serve not only to confine and direct the air and cause the same to circulate around the main steam-pipe, but, further, are of service in preventing the loss of heat by radiation from said main supply-pipe, which would result if it were left uncovered and unprotected. By the use of air in the indirect method the main steam-pipe acts directly as a heater, and the heat of the steam at its highest temperature is transmitted directly to the air. The air may be caused to circulate circuitously through said boxes $b$ and $b'$ by an arrangement of partitions, if desirable. After having been sufficiently heated in said boxes the air passes therefrom through the pipes $b^2$ into each of the air-chambers $b^3$ $b^4$. An offshoot from the steam-pipe $a^6$ may be carried into each of these chambers to further raise the temperature of the air.

As hereinbefore mentioned, the air may escape from the said chambers $B^3$ and $b^4$ directly into the car, or may be, and preferably is, particularly for cold climates and weather, caused to pass from said chambers into and through the steam-enveloped distributing-pipes and thence into the interior of the car. By this arrangement the pipes $a^5$ act directly as steam-radiators and heat the air in the car by contact therewith and radiation, and at the same time the steam within the said pipes $a^5$ heats the air-conducting pipes which pass therethrough. Thus the live steam is utilized in both the direct and indirect methods. The air is not only heated in the pipes that are placed within the car, but the temperature of the air is gradually raised from the time it enters the system of piping, being heated first by the steam-jet in the pipe $e$, then by the condensed steam in the condensed-steam chamber, after which it is again heated in the boxes $b$ $b'$ by contact with the main steam-pipes and then passes into the distributing-pipes $b^5$, where it is finally heated, as above mentioned, before it flows into the car.

Within the air-conducting flues and boxes are arranged wire screens $g$, which serve to catch any impurities contained in the air, and may be so arranged and constructed that each succeeding screen is of finer mesh than the one immediately preceding, so that the air is filtered through a graduated series of screens as it flows from without to within the car. The screens also act to heat the air passing therethrough, particularly in those flues having a steam-pipe passing therethrough, since the screens become heated by contact with the pipes and impart the heat to the air. As indicated in Fig. 8, the screens are preferably inclined in the direction from which the air-current flows to throw the particles of dust, &c., down toward the bottom of the flues.

Owing to the distance which the air is caused to travel before it enters the car and to the means for regulating the pressure, the air is caused to move slowly through the flues and chambers, and in consequence opportunity is offered for the deposition of any impurities in the air upon the bottom of the flues during the transit, and also the air is held longer in contact with the steam-pipes. To render the interior of the boxes $b$ $b'$ accessible, in order to clean the same, doors $h$ are suitably placed in said boxes. (Shown in Fig. 8.)

In Fig. 10, in the air-box $b$ are shown openings $i$, closed by dampers $i'$ and turned by rods $i^2$, which extend up into the car, so as to be operated within the same. The purpose of these dampers is to admit cold air directly into the current of hot air to lower the temperature thereof should it become too high.

In Fig. 12 is illustrated a form of the air-receiver which is non-adjustable, and consists of two openings $e'$, provided with two dampers $e^2$, between which is an opening $e^4$, corresponding to and answering for the same purpose as the pipe $e^4$ in Fig. 11. Connecting each of the receivers with the pipe $e$ are pipes $e^7$, in each of which are dampers $e^8$, which are preferably operated from within the car by suitable rods, &c. By using the condensed steam the advantages hereinbefore mentioned are not only attained, but also the heat stored in the condensed-steam receptacle is available when the cars are standing in a station or are side-tracked. When the supply of steam is cut off and the heat has been abstracted from the condensed steam, an independent heating device (shown in Fig. 9) attached to the condensed-steam receptacle is used. As illustrated in said view, the supplemental heater consists of a burner $j$, arranged in a chamber $j'$, beneath a plate $j^2$, which forms the bottom of the air-chamber $d^4$. Opening into the burner $j$ is an atomizer $j^3$, which sprays the oil from the can $j^4$ into the burner, in which the oil is ignited and heats the plate $j^2$. As the air passes up over the plate $j^2$ it becomes heated and heats the pipes $d^7$, which in turn heat the water of condensation in the chamber $d^6$, thus storing up heat therein. The air is supplied to the atomizer through the pipes $j^5$ from the compressed-air cylinder of the air-brake, and after steam has been generated in the chamber $d^6$ the pipe $j^6$ conducts the steam to the atomizer.

While I have devised this form of heater to be used in my system, still I am in no wise limited to the particular form shown.

To regulate the pressure of the live steam from the dome of the locomotive, a reducing-valve is placed in the pipe $a'$, as will be understood.

By the peculiar construction of the device illustrated in Fig. 2 the live steam rushing into the main steam-pipe creates a vacuum, which draws the exhaust-steam through the pipe $a^2$.

For purifying the air during the summer or at any time of the year, the system herein described for that purpose may be used independently of the heating system.

I am aware that many changes of construction and arrangement of the different parts of my system may be made, and therefore I do not wish to limit my invention to the exact devices herein set forth.

Having thus described my invention, what I claim is—

1. In a car-heating apparatus, the combination of a car, a steam-pipe which is placed within said car and which may heat the same by direct radiation, air-distributing pipes within said steam-pipe, and suitable tubes connected with the same by which the heated air may be distributed through the car, together with a hood outside of and mounted on the car, and suitable intermediate connections between the hood and the hot-air-distributing pipes, whereby the air collected by said hood may be purified or partially heated before being delivered to the hot-air-distributing pipes within the steam-pipe, substantially as described.

2. In a system for heating cars, the combination of the main steam-conducting pipes arranged beneath the car, which conduct the steam from the boiler, an air-receiving chamber surrounding said pipes, and a second air-receiving chamber communicating with said air-receiving chamber and arranged within and opening into the car, for the purposes set forth.

3. In a system for heating cars, the combination of the main steam-conducting pipes, an air-receiving chamber surrounding said pipes, a wedge-shaped chamber communicating with said air-receiving chamber, a steam pipe or radiator communicating with the main conducting-pipe, and an air-receiving pipe or pipes arranged within said steam-pipe communicating with the wedge-shaped chamber and provided with tubes opening through the inclosing steam-pipe into the car, for the purposes set forth.

4. In a system for heating cars, the combination of the main steam pipe or pipes arranged beneath and outside of the car, an inclosing air-receiving chamber surrounding said main steam-pipe, and a second air-receiving chamber communicating with said inclosing air-chamber and opening into the car, for the purposes set forth.

5. In a system for heating and ventilating cars, the combination of the main steam-pipe, an air-chamber inclosing said steam-pipe, means for conducting the air from this inclosing chamber or box into the car, and a condensed-steam receptacle connected with said main steam-pipe and provided with air-chambers therein opening into the inclosed box around the main steam-pipe, for the purposes set forth.

6. In a system for heating and ventilating cars, an air-heating device consisting of a water or steam receptacle, air-pipes extending through said receptacle and opening into air-chambers $d^3$ and $d^4$, conducting-pipes for supplying air to one of said air-chambers, tubes for conducting the air from the other of said chambers into the cars, and means for heating said air as it passes through said chambers and pipes, for the purposes set forth.

7. In a system for heating cars, the combination of the main steam-pipe arranged beneath the car, an inclosing air box or flue surrounding said steam-pipe, wedge-shaped chambers arranged within the car, with their tapered ends extending toward each other, flues or pipes connecting said wedge-shaped chambers with the inclosing air-box arranged beneath the car, steam-pipes arranged above the said wedge-shaped chambers and inclined toward the tapered ends thereof, air pipes or flues connected with the wedge-shaped chambers and arranged within and opening through said steam-pipes into the car, a condensed-steam receptacle connected with the inclined steam-pipes arranged within the car and having air-passages therein opening into the inclosing air-box surrounding the main steam-pipe, and means for admitting air into the air-passages in the condensed-steam receptacle, for the purposes set forth.

8. In a system for heating cars, the combination of the main steam-pipe arranged beneath the car, an inclosing air box or flue surrounding said steam-pipe, wedge-shaped chambers arranged within the car, with their tapered ends extending toward each other, flues or pipes connecting said wedge-shaped chambers with the inclosing air-box arranged beneath the car, steam-pipes arranged above the said wedge-shaped chambers and inclined toward the tapered ends thereof, air pipes or flues connected with the wedge-shaped chambers and arranged within and opening through said steam-pipes into the car, a condensed-steam receptacle connected with the inclined steam-pipes arranged within the car and having air-passages therein opening into the inclosing air-box surrounding the main steam-pipe, an air-conducting pipe opening into said air-spaces in the condensed-steam receptacle, through which the outside air is conducted thereinto, and a steam injector or pipe opening into said air-conducting pipe, for the purposes set forth.

9. In a system for heating cars, the combination of the main steam-pipes $a$, extending beneath and on opposite sides of the car, inclosing air-boxes $b$, wedge-shaped boxes or chambers $b^3$ $b^4$, arranged within and on opposite sides of the car, with their tapered ends extending toward each other, pipes $b^2$, connecting the broad ends of said chambers $b^3$ $b^4$ with the air-boxes $b$, steam-pipes $a^5$, resting upon and conforming to the inclination of the wedge-shaped chambers, a steam-pipe $a^6$, connecting said pipes $a^5$ with the main pipe $a$, and pipes $b^5$, arranged within and opening through said pipes into the car and independently connected with the broad and narrow ends of the chambers $b^3$ $b^4$ by pipes, all said parts being arranged and operating substantially as and for the purposes set forth.

10. In a system for heating cars, the combination of the main steam-supply pipe or pipes arranged beneath the car, an inclosing air-chamber surrounding said pipe or pipes, and wedge-shaped air boxes or chambers arranged within and opening into the car and communicating with the inclosing air-chamber beneath the car, said wedge-shaped chambers being arranged with their broad and narrow ends opening into the ends of the car, for the purposes set forth.

11. In a system for heating cars, wedge-shaped chambers opening into the car and placed with their broad ends in the ends of the cars, near the doors thereof, openings for the exit of the air being provided in both the narrow and broad ends of said wedge-shaped chambers, for the purposes set forth.

12. In a system for heating cars, the combination, with wedge-shaped chambers opening into the car and placed with their broad ends in the ends of the car, near the doors thereof, openings for the exit of the air being provided in both the broad and narrow ends of said wedge-shaped chambers, of means whereby heated air is forced into the car through said chambers, for the purposes set forth.

In testimony whereof I affix my signature in presence of two witnesses.

EDWARD F. ROBERTS.

Witnesses:
F. L. MICHAEL,
JOHN F. DORTHY.